United States Patent
Brody et al.

(10) Patent No.: US 11,677,766 B2
(45) Date of Patent: *Jun. 13, 2023

(54) ADDITIVE FRIEND SUGGESTION FOR ACCOUNT SECURITY

(71) Applicant: Snap Inc., Santa Monica, CA (US)

(72) Inventors: Jonathan Brody, Marina Del Rey, CA (US); Donald Giovannini, Venice, CA (US); Edward Koai, Santa Monica, CA (US); Jie Wu, Bellevue, WA (US); Lin Zhong, Bothell, WA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/521,620

(22) Filed: Nov. 8, 2021

(65) Prior Publication Data

US 2022/0070187 A1    Mar. 3, 2022

Related U.S. Application Data

(63) Continuation of application No. 16/457,446, filed on Jun. 28, 2019, now Pat. No. 11,171,972.

(Continued)

(51) Int. Cl.
*H04L 29/06* (2006.01)
*G06F 21/00* (2013.01)
*H04L 9/40* (2022.01)

(52) U.S. Cl.
CPC ...... *H04L 63/1416* (2013.01); *H04L 63/1425* (2013.01); *H04L 63/1475* (2013.01)

(58) Field of Classification Search
None
See application file for complete search history.

(56) References Cited

U.S. PATENT DOCUMENTS 10,459,953 B1 * 10/2019 Ji ........................ G06Q 50/01
11,171,972 B1    11/2021 Brody et al.
(Continued)

OTHER PUBLICATIONS

Brendel et al. "Practical Privacy—Preserving Friend Recommendations on Social Networks". Companion PRoceedings of the Web Conference 2018. Apr. 2018. pp. 111-112.*

(Continued)

*Primary Examiner* — Lisa C Lewis
(74) *Attorney, Agent, or Firm* — Schwegman Lundberg & Woessner, P.A.

(57) ABSTRACT

Systems, methods, devices, instructions, and media are described for generating suggestions for connections between accounts in a social media system. One embodiment involves storing connection graph information for a plurality of user accounts, and identifying, by one or more processors of the device, a first set of connection suggestions based on a first set of suggestion metrics. A second set of connection suggestions is then identified based on a second set of suggestion metrics, wherein the second set of connection suggestions and the second set of suggestion metrics are configured to obscure the first set of connection suggestions, and a set of suggested connections is generated based on the first set of connection suggestions and the second set of connection suggestions. The set of connection suggestions is then communicated to a client device method associated with the first account.

19 Claims, 11 Drawing Sheets

Related U.S. Application Data

(60) Provisional application No. 62/692,489, filed on Jun. 29, 2018.

(56) References Cited

U.S. PATENT DOCUMENTS

| | | | | |
|---|---|---|---|---|
| 2006/0156326 | A1* | 7/2006 | Goronzy | H04N 21/44222 725/9 |
| 2009/0271370 | A1* | 10/2009 | Jagadish | H04L 51/52 709/204 |
| 2013/0325948 | A1* | 12/2013 | Chen | H04L 67/535 709/204 |
| 2014/0156566 | A1* | 6/2014 | Kabiljo | G06Q 50/01 706/12 |
| 2014/0274358 | A1* | 9/2014 | Hoskins | A63F 13/87 463/29 |
| 2015/0106365 | A1* | 4/2015 | Shah | G06F 16/24 707/725 |
| 2015/0106371 | A1* | 4/2015 | Shah | G06F 3/04842 707/736 |
| 2015/0135261 | A1* | 5/2015 | Park | H04L 63/102 726/4 |
| 2015/0142721 | A1* | 5/2015 | Chakrabarti | G06N 7/00 706/52 |
| 2015/0242967 | A1* | 8/2015 | Shsh | G06Q 50/01 705/319 |
| 2015/0278909 | A1* | 10/2015 | Bax | G06Q 30/0631 705/26.7 |
| 2016/0358214 | A1* | 12/2016 | Shalunov | G06Q 30/0639 |
| 2018/0082678 | A1* | 3/2018 | Olmstead | G10L 15/22 |

OTHER PUBLICATIONS

"U.S. Appl. No. 16/457,446, Non Final Office Action dated Mar. 23, 2021", 10 pgs.

"U.S. Appl. No. 16/457,446, Response filed Jun. 23, 2021 to Non Final Office Action dated Mar. 23, 2021", 10 pages.

"U.S. Appl. No. 16/457,446, Examiner Interview Summary dated Jun. 28, 2021", 2 pgs.

"U.S. Appl. No. 16/457,446, Notice of Allowance dated Jul. 6, 2021", 8 pgs.

U.S. Appl. No. 16/457,446, filed Jun. 28, 2019, Additive Friend Suggestion for Account Security, U.S. Pat. No. 11,171,972.

* cited by examiner

US 11,677,766 B2

ADDITIVE FRIEND SUGGESTION FOR ACCOUNT SECURITY

CROSS REFERENCE TO RELATED APPLICATIONS

The application is a continuation of U.S. patent application Ser. No. 16/457,446, filed Jun. 28, 2019, which application claims priority to U.S. Provisional Application No. 62/692,489, filed Jun. 29, 2018, and entitled "ADDITIVE FRIEND SUGGESTION." The contents of this prior application are considered part of this application and are hereby incorporated by reference in its entirety.

TECHNICAL FIELD

The present disclosure generally relates to facilitating electronic communication between users. In particular, example embodiments of the present disclosure address systems, methods, and user interfaces to facilitate communication between users via multiple modes of electronic communication.

BACKGROUND

A content sharing platform may receive millions of messages from users desiring to share media content such as audio, images, and video between user devices (e.g., mobile devices, personal computers, etc.) The media content of these messages may be shared with accounts associated with the sharing account, and allow users to exchange messages with one another. These applications often provide a graphical interface from which a user can send and receive text-based messages exchanged as part of an electronic conversation with other users. Often these applications run on mobile and other electronic devices that are capable of facilitating other modes of electronic communication such as voice or video calling. Connections between may be based on user approval, and various methods are available for presenting and confirming such approvals to create connections between accounts in a network.

BRIEF DESCRIPTION OF THE DRAWINGS

Various ones of the appended drawings merely illustrate example embodiments of the present disclosure and should not be considered as limiting its scope.

DETAILED DESCRIPTION

Systems and methods described herein relate to systems, methods, devices, and instructions stored in device memory for friend suggestion inventory generation for improved security and prevention of attacks by malicious accounts. This includes systems for presenting information to a user, and systems and methods within such an interface or supporting such an interface for presenting suggestions for new connections with other user accounts within a system in a way that protects the privacy of various users. The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Online social networks attract attacks and exploits in various fashions. In some such attacks, attackers control accounts which may either be fake or compromised real accounts. If an attacker has a sufficiently large number of such accounts, the accounts may be used to gather information that is not intended to be shared. One type of attack may use large numbers of accounts with friend suggestion data to create a large-scale leakage of connections between users. In particular, if an attacker is able to infer a particular connection between users based on the fact of a suggested connection, with sufficient numbers of accounts and connections a large amount of connection information within a social network may be gained by the attacker. Embodiments described herein include randomized or "noisy" suggestions to prevent attackers from directly inferring connection graph information. Additional details of various embodiments are described below.

Figure 1:
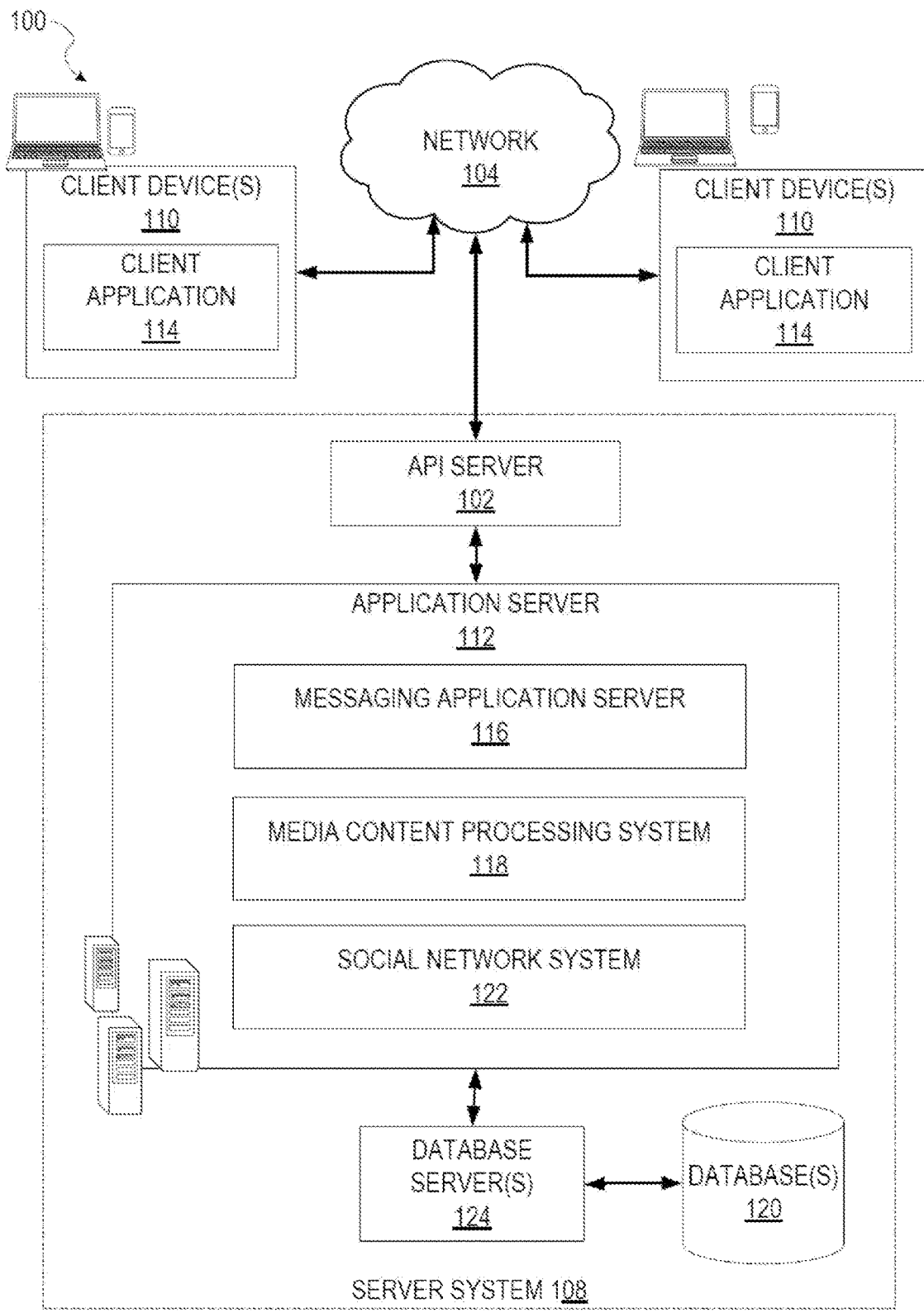
FIG. 1 is a block diagram showing an example messaging system for exchanging data (e.g., messages and associated content) over a network, according to some example embodiments.

FIG. 1 is a block diagram illustrating a networked system 100 (e.g., a messaging system) for exchanging data (e.g., messages and associated content) over a network. The networked system 100 includes multiple client devices 110, each of which hosts a number of client applications 114. Each client application 114 is communicatively coupled to other instances of the client application 114 and a server system 108 via a network 104.

The client device 110 may comprise, but is not limited to, a mobile phone, desktop computer, laptop, portable digital assistant (PDA), smart phone, tablet, ultrabook, netbook, laptop, multi-processor system, microprocessor-based or programmable consumer electronic system, game console, set-top box, computer in a vehicle, wearable device, or any other communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, global positioning system (GPS) devices, and so forth.

The client device 110 may be a device of a user that is used to create media content items such as video, images (e.g., photographs), and audio, and to send and receive messages containing such media content items, text, and so forth, to and from other users. The client device 110 may be a device of a user that is used to create and edit media overlays, view and generate messages, and so forth. As described in more detail below, client devices can be associated with a particular user account, and can receive suggestions from a social network system 122 for possible connections with other user accounts in the social network system. In accordance with various embodiments described herein, noisy suggestions can be made to prevent the use of connection suggestion information being used to determine or infer non-public information about a user account.

One or more users may be a person, a machine, or other means of interacting with the client device 110. In example embodiments, the user may not be part of the system 100, but may interact with the system 100 via the client device 110 or other means. For instance, the user may provide input (e.g., touch screen input or alphanumeric input) to the client device 110, and the input may be communicated to other entities in the system 100 (e.g., third party servers, server system 108, etc.) via a network 104. In this instance, the other entities in the system 100, in response to receiving the input from the user, may communicate information to the client device 110 via the network 104 to be presented to the user. In this way, the user may interact with the various entities in the system 100 using the client device 110. As part of such operations, a system may maintain a list of connections between users that communicate regularly, or users that have indicated a connection via inputs to the network (e.g. a "friend" connection.)

The system 100 may further include a network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WI-FI network, a WiMax network, another type of network, or a combination of two or more such networks.

The client device 110 may access the various data and applications provided by other entities in the system 100 via a web client (e.g., a browser, such as the Internet Explorer® browser developed by Microsoft® Corporation of Redmond, Wash. State) or one or more client applications 114. The client device 110 may include one or more client applications 114 (also referred to as "apps") such as, but not limited to, a web browser, a messaging application, an electronic mail (email) application, an e-commerce site application, a mapping or location application, a media overlay application, and the like.

In some embodiments, one or more client applications 114 may be included in a given one of the client devices 110, and configured to locally provide the user interface and at least some of the functionalities, with the client application 114 configured to communicate with other entities in the system 100 (e.g., third party servers, server system 108, etc.), on an as-needed basis, for data and/or processing capabilities not locally available (e.g., to process user queries, to authenticate a user, to verify a method of payment, etc.). Conversely, one or more client applications 114 may not be included in the client device 110, and then the client device 110 may use its web browser to access the one or more applications hosted on other entities in the system 100 (e.g., third party servers, server system 108, etc.).

In one example, a client application 114 may be a messaging application that allows a user to take a photograph or video, add a caption or otherwise edit the photograph or video, and then send the photograph or video to another user. In one example, the message may be ephemeral and be removed from a receiving user device after viewing or after a predetermined amount of time (e.g., 10 seconds, 24 hours, etc.). An ephemeral message refers to a message that is accessible for a time-limited duration. An ephemeral message may be a text, an image, a video, and other such content that may be stitched together in accordance with embodiments described herein. The access time for the ephemeral message may be set by the message sender. Alternatively, the access time may be a default setting or a setting specified by the recipient. Regardless of the setting technique, the message is transitory.

The messaging application may further allow a user to create a gallery or message collection. A gallery may be a collection of photos and videos which may be viewed by other users "following" the user's gallery (e.g., subscribed to view and receive updates in the user's gallery). In one example, the gallery may also be ephemeral (e.g., lasting 24 hours, lasting for a duration of an event (e.g., during a music concert, sporting event, etc.), or lasting another predetermined time).

An ephemeral message may be associated with a message duration parameter, the value of which determines an amount of time that the ephemeral message will be displayed to a receiving user of the ephemeral message by the client application 114. The ephemeral message may be further associated with a message receiver identifier and a message timer. The message timer may be responsible for determining the amount of time the ephemeral message is shown to a particular receiving user identified by the message receiver identifier. For example, the ephemeral message may only be shown to the relevant receiving user for a time period determined by the value of the message duration parameter.

In another example, the messaging application may allow a user to store photographs and videos and create a gallery that is not ephemeral and that can be sent to other users. For example, a user may assemble photographs and videos from a recent vacation to share with friends and family.

The server system 108 may provide server-side functionality via the network 104 (e.g., the Internet or a wide area network (WAN)) to one or more client devices 110 and/or one or more third party servers (not shown). The server system 108 may include an application programming interface (API) server 102, an application server 112, a messaging application server 116, a media content processing system 118, and a social network system 122, which may each be communicatively coupled with each other and with one or more data storage(s), such as database(s) 120.

The server system 108 may be a cloud computing environment, according to some example embodiments. The server system 108, and any servers associated with the server system 108, may be associated with a cloud-based application, in one example embodiment.

The one or more database(s) 120 may be storage devices that store information such as untreated media content, original media content from users (e.g., high-quality media content), processed media content (e.g., media content that is formatted for sharing with client devices 110 and viewing on client devices 110), context data related to a media content item, context data related to a user device (e.g., computing or client device 110), media overlays, media overlay smart widgets or smart elements, user data, user device information, media content (e.g., video and images), media content data (e.g., data associated with video and images), computing device context data, serialized data, session data items, and so forth. The one or more databases 120 may further store information related to third party servers, third party applications, client devices 110, client applications 114, users, and so forth.

The one or more database(s) 120 may include cloud-based storage external to the server system 108 (e.g., hosted by one or more third-party entities external to the server system 108). While the storage devices are shown as database(s) 120, it is to be understood that the system 100 may access and store data in storage devices such as databases 120, blob storages, and other types of storage methods.

As described above, databases 120 can include account information, including information about connections between user accounts, and information that can be used to communicate suggestions on additional possible connections that are suggested to a user via a user's client device. Embodiments described herein access such information from sources such as databases 120, and use noisy filters to make suggestions on connections between accounts in a way that prevents inference of other user's social graphs within the social network system.

The system 100 may further include one or more third party servers (not shown). The one or more third party servers may include one or more third party application(s). The one or more third party application(s), executing on the third party server(s), may interact with the server system 108 via API server 102 via a programmatic interface provided by the API server 102. For example, one or more of the third party applications may request and utilize information from the server system 108 via the API server 102 to support one or more features or functions on a website hosted by the third party or an application hosted by the third party. The third party website or application, for example, may provide functionality that is supported by relevant functionality and data in the server system 108.

Accordingly, each client application 114 is able to communicate and exchange data with other client applications 114 and with the server system 108 via the network 104. The data exchanged between client applications 114, and between a client application 114 and the server system 108, includes functions (e.g., commands to invoke functions) as well as payload data (e.g., text, audio, video, or other multimedia data).

The server system 108 provides server-side functionality via the network 104 to a particular client application 114. While certain functions of the system 100 are described herein as being performed by either a client application 114 or by the server system 108, it will be appreciated that the location of certain functionality either within the client application 114 or within the server system 108 is a design choice. For example, it may be technically preferable to initially deploy certain technology and functionality within the server system 108, but to later migrate this technology and functionality to the client application 114 where a client device 110 has a sufficient processing capacity.

The server system 108 supports various services and operations that are provided to the client application 114. Such operations include transmitting data to, receiving data from, and processing data generated by the client application 114. This data may include message content, client device information, geolocation information, media annotation and overlays, message content persistence conditions, social network information, live event information, date and time stamps, media content (e.g., video and images), and media content data (e.g., data associated with video and images), as examples. Data exchanges within the networked system 100 are invoked and controlled through functions available via user interfaces (UIs) of the client application 114.

In the server system 108, the API server 110 is coupled to, and provides a programmatic interface to, the application server 112. The application server 112 is communicatively coupled to a database server 124, which facilitates access to the one or more database(s) 120 in which is stored data associated with messages processed by the application server 112.

The API server 102 receives and transmits message data (e.g., commands and message payloads) between the client device 110 and the application server 112. Specifically, the API server 102 provides a set of interfaces (e.g., routines and protocols) that can be called or queried by the client application 114 in order to invoke functionality of the application server 112. The API server 102 exposes various functions supported by the application server 112, including account registration; login functionality; the sending of messages, via the application server 112, from a particular client application 114 to another client application 114; the sending of media files (e.g., images or video) from a client application 114 to the messaging application server 116, for possible access by another client application 114; the setting of a collection of media data (e.g., a gallery, story, message collection, or media collection); the retrieval of a list of friends of a user of a client device 110; the retrieval of such collections; the retrieval of messages and content; the adding of friends to and deletion of friends from a social graph; the location of friends within a social graph; opening an application event (e.g., relating to the client application 114); and so forth.

The application server 112 hosts a number of applications and subsystems, including the messaging application server 116, the media content processing system 118, and the social network system 122. The messaging application server 116 implements a number of message processing technologies and functions, particularly related to the aggregation and other processing of content (e.g., textual and multimedia content) included in messages received from multiple instances of the client application 114. The text and media content from multiple sources may be aggregated into collections of content (e.g., called stories, galleries, or media collections). These collections are then made available, by the messaging application server 116, to the client application 114. Other processor- and memory-intensive processing of data may also be performed server-side by the messaging application server 116, in view of the hardware requirements for such processing.

The application server 112 also includes the media content processing system 118, which is dedicated to performing various media content processing operations, typically with respect to images or video received within the payload of a message at the messaging application server 116. The media content processing system 118 may access one or more data storages (e.g., database(s) 120) to retrieve stored data to use in processing media content and to store results of processed media content.

The social network system 122 supports various social networking functions and services, and makes these functions and services available to the messaging application server 116. To this end, the social network system 122 maintains and accesses an entity graph 304 (depicted in FIG. 3) within the database 120. Examples of functions and services supported by the social network system 122 include the identification of other users of the networked system 100 with whom a particular user has relationships or whom the particular user is "following," and also the identification of other entities and interests of a particular user. The associations or relationships may be referred to as "connections", "friend connections", "follower connections" or any other such relationship or connection identified by a system. A set of such connections may be referred to as a graph or connection graph stored in a system 122 as connection graph information.

The messaging application server 116 may be responsible for generation and delivery of messages between users of client devices 110. The messaging application server 116 may utilize any one of a number of message delivery networks and platforms to deliver messages to users. For example, the messaging application server 116 may deliver messages using electronic mail (email), instant message (IM), Short Message Service (SMS), text, facsimile, or voice (e.g., Voice over IP (VoIP)) messages via wired networks (e.g., the Internet), plain old telephone service (POTS), or wireless networks (e.g., mobile, cellular, WIFI, Long Term Evolution (LTE), or Bluetooth).

Figure 2:
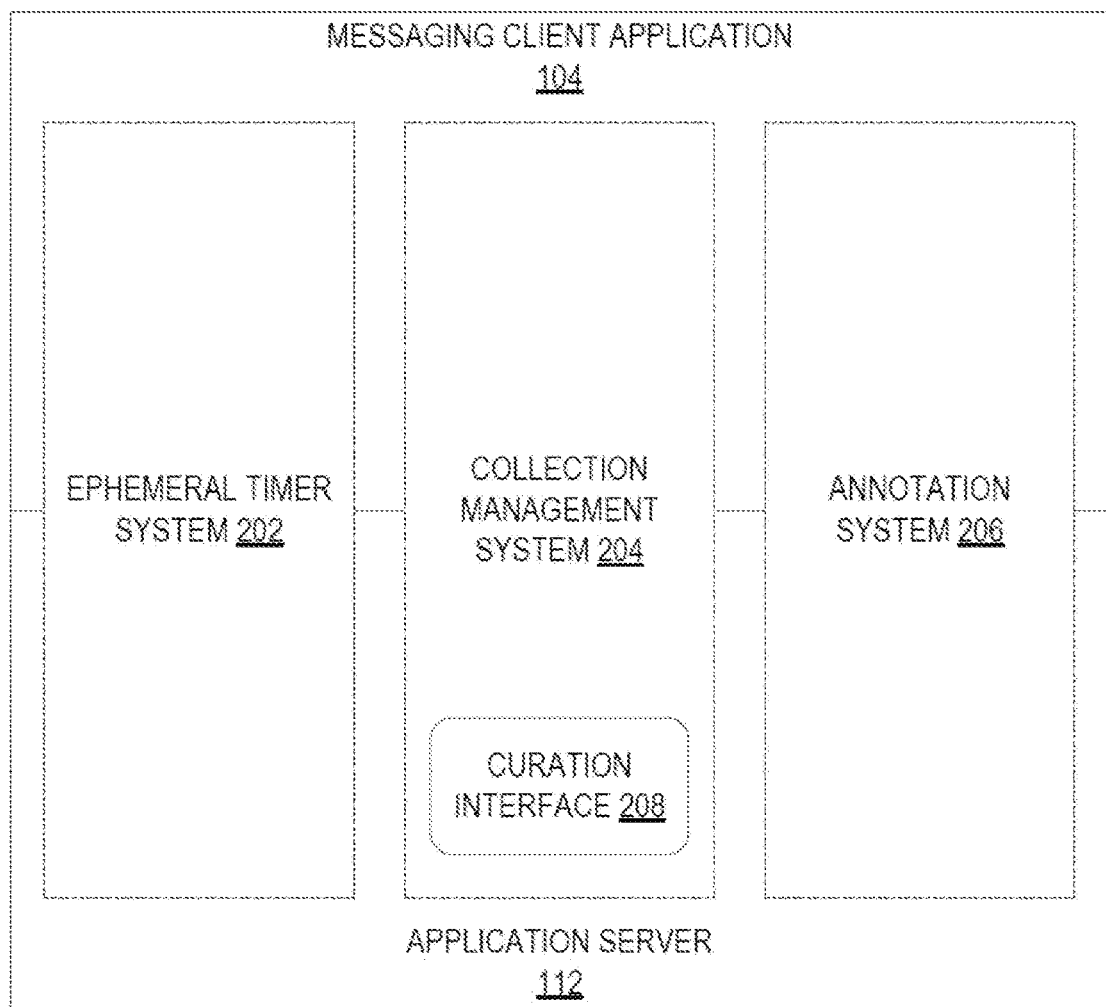
FIG. 2 is a block diagram illustrating further details regarding the messaging system, according to some example embodiments.

FIG. 2 is a block diagram 200 illustrating further details regarding the system 100, according to example embodiments. Specifically, the system 200 is shown to comprise the messaging client application 114 and the application server 112, which in turn embody a number of subsystems, namely an ephemeral timer system 202, a collection management system 204, and an annotation system 206.

The ephemeral timer system 202 is responsible for enforcing the temporary access to content permitted by the messaging client application 114 and the messaging application server 116. To this end, the ephemeral timer system 202 incorporates a number of timers that, based on duration and display parameters associated with a message, or collection of messages (e.g., otherwise referred to herein as media collections, galleries, message collections, stories, and the like), selectively display and enable access to messages and associated content via the messaging client application 114.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "Story" for the duration of that music concert. The collection management system 204 may also be responsible for publishing an icon that provides notification of the existence of a particular collection to the user interface of the messaging client application 114.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation (e.g., money, non-money credits or points associated with the messaging system or a third party reward system, travel miles, access to artwork or specialized lenses, etc.) may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the networked system 100. In one example, the annotation system 206 operatively supplies a media overlay (e.g., a filter or media augmentation) to the messaging client application 114 based on a geolocation of the client device 110. In another example, the annotation system 206 operatively supplies a media overlay to the messaging client application 114 based on other information, such as social network information of the user of the client device 110. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 110. For example, the media overlay includes text that can be overlaid on top of a photograph taken by the client device 110. In another example, the media overlay includes an identification of a location overlay (e.g., Venice Beach), a name of a live event, or a name of a merchant overlay (e.g., Beach Coffee House). In another example, the annotation system 206 uses the geolocation of the client device 110 to identify a media overlay that includes the name of a merchant at the geolocation of the client device 110. The media overlay may include other indicia associated with the merchant. The media overlays may be stored in the database 120 and accessed through the database server 124.

In one example embodiment, the annotation system 206 provides a user-based publication platform that enables users to select a geolocation on a map, and upload content associated with the selected geolocation. The user may also specify circumstances under which a particular media overlay is to be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time.

Figure 3:
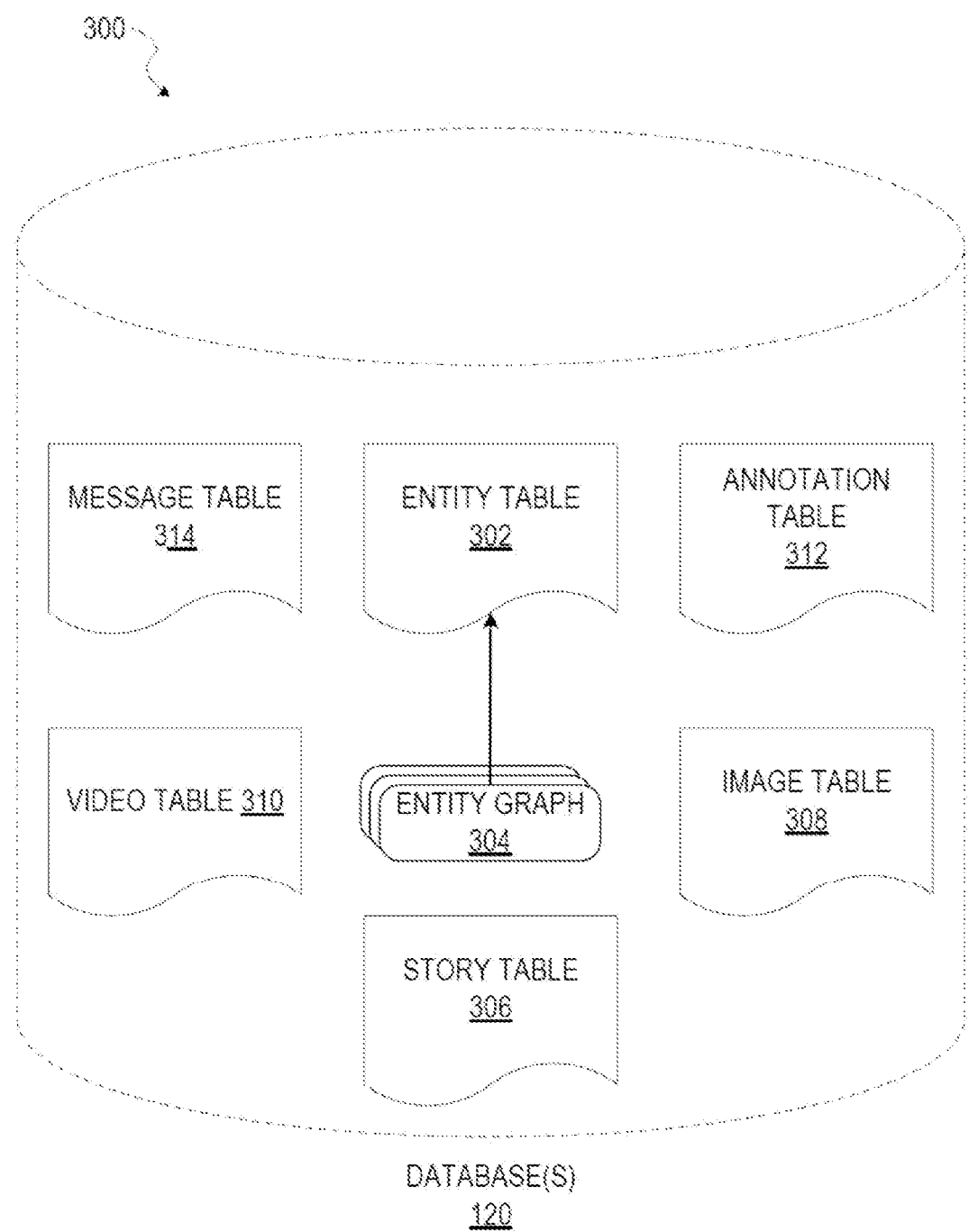
FIG. 3 is a schematic diagram illustrating data which may be stored in a database of a messaging server system, including connection graph information, according to some example embodiments.

FIG. 3 is a schematic diagram 300 illustrating data which may be stored in the database(s) 120 of the server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, etc. Regardless of type, any entity regarding which the server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization), interested-based, or activity-based, merely for example. A system can suggest additional relationships and associations between entities, based on existing relationships and associations, or using any other such information from databases 120 as described herein.

The database 120 also stores annotation data, in the example form of media overlays or filters, in an annotation table 312. Annotation data may also be referred to herein as "creative tools" or "interactive features." Annotation data may comprise predefined messages to be provided to users.

Media overlays or filters, for which data is stored within the annotation table 312, are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including user-selected filters from a gallery of filters presented to a sending user by the messaging client application 114 when the sending user is composing a message. Other types of filters include geolocation filters (also known as geo-filters), which may be presented to a sending user based on geographic location. For example, geolocation filters specific to a neighborhood or special location may be presented within a user interface by the messaging client application 114, based on geolocation information determined by a GPS unit of the client device 110. Another type of filter is a data filter, which may be selectively presented to a sending user by the messaging client application 114, based on other inputs or information gathered by the client device 110 during the message creation process. Examples of data filters include a current temperature at a specific location, a current speed at which a sending user is traveling, a battery life for a client device 110, or the current time.

Other annotation data that may be stored within the annotation table 312 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the message table 314. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a story, gallery, or media collection). The creation of a particular collection may be initiated by a particular user (e.g., any user for whom a record is maintained in the entity table 302). A user may create a "personal story" in the form of a collection of content that has been created and sent/broadcast by that user. To this end, the user interface of the messaging client application 114 may include an icon that is user-selectable to enable a sending user to add specific content to his or her personal story.

A media or message collection may also constitute a "live story," which is a collection of content from multiple users that is created manually, automatically, or using a combination of manual and automatic techniques. For example, a "live story" may constitute a curated stream of user-submitted content from various locations and events. Users whose client devices 110 have location services enabled and are at a common event location at a particular time may, for example, be presented with an option, via a user interface of the messaging client application 114, to contribute content to a particular live story. The live story may be identified to the user by the messaging client application 114, based on his or her location. The end result is a "live story" told from a community perspective.

A further type of content collection is known as a "location story," which enables a user whose client device 110 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
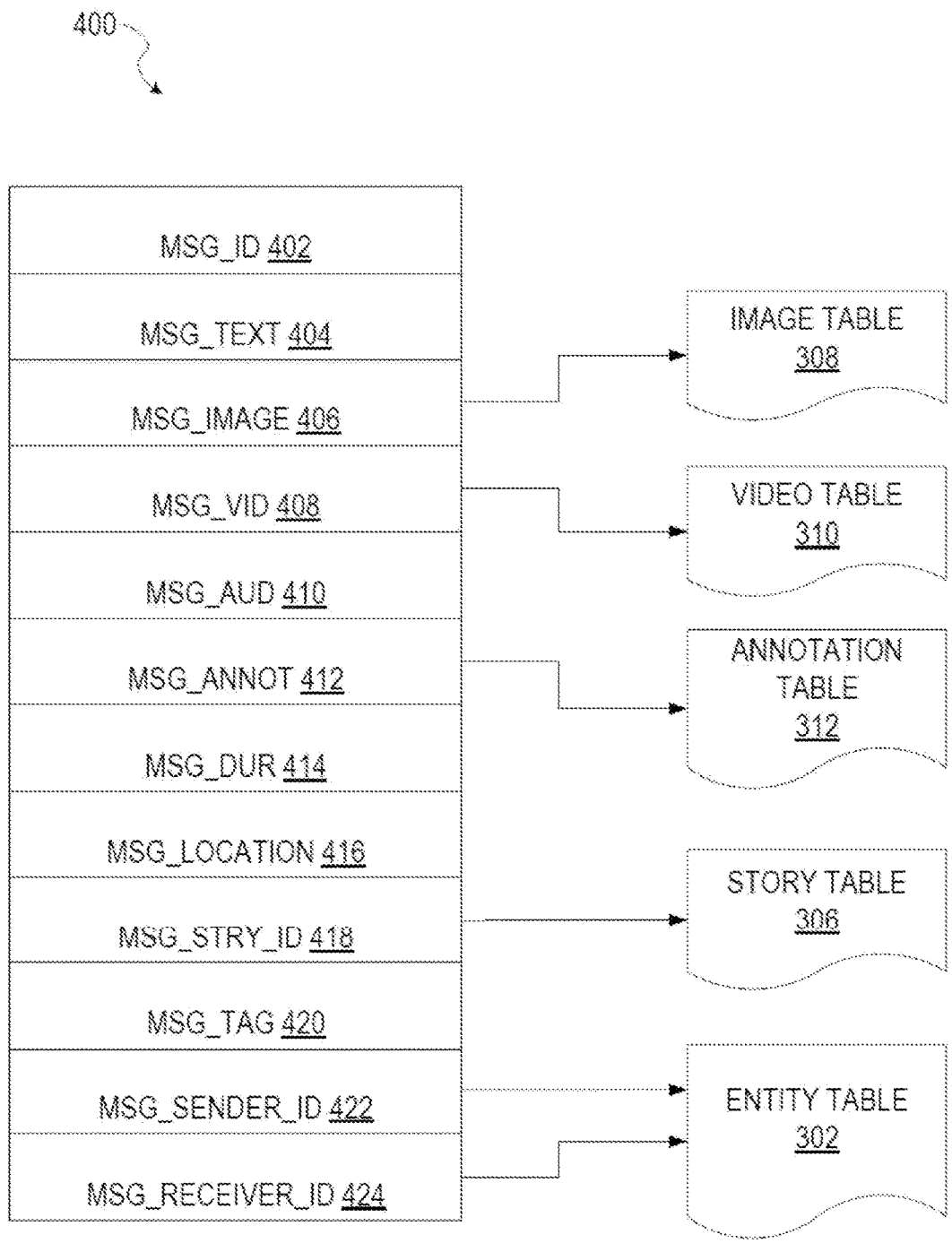
FIG. 4 is a schematic diagram illustrating a structure of a message, according to some embodiments, generated by a messaging client application for communication.

FIG. 4 is a schematic diagram illustrating a structure of a message 400, according to some embodiments, generated by a client application 114 for communication to a further client application 114 or the messaging application server 116. The content of a particular message 400 is used to populate the message table 314 stored within the database 120, accessible by the messaging application server 116. Similarly, the content of a message 400 is stored in memory as "in-transit" or "in-flight" data of the client device 110 or the application server 112. The message 400 is shown to include the following components:

A message identifier 402: a unique identifier that identifies the message 400.

A message text payload 404: text, to be generated by a user via a user interface of the client device 110 and that is included in the message 400.

A message image payload 406: image data, captured by a camera component of a client device 110 or retrieved from memory of a client device 110, and that is included in the message 400.

A message video payload 408: video data, captured by a camera component or retrieved from a memory component of the client device 110 and that is included in the message 400.

A message audio payload 410: audio data, captured by a microphone or retrieved from the memory component of the client device 110, and that is included in the message 400.

A message annotations 412: annotation data (e.g., media overlays such as filters, stickers, or other enhancements) that represents annotations to be applied to the message image payload 406, message video payload 408, or message audio payload 410 of the message 400.

A message duration parameter 414: a parameter value indicating, in seconds, the amount of time for which content of the message 400 (e.g., the message image payload 406, message video payload 408, message audio payload 410) is to be presented or made accessible to a user via the messaging client application 114.

A message geolocation parameter 416: geolocation data (e.g., latitudinal and longitudinal coordinates) associated with the content payload of the message 400. Multiple message geolocation parameter 416 values may be included in the payload, each of these parameter values being associated with respect to content items included in the content (e.g., a specific image within the message image payload 406, or a specific video in the message video payload 408).

A message story identifier 418: identifier values identifying one or more content collections (e.g., "stories") with which a particular content item in the message image payload 406 of the message 400 is associated. For example, multiple images within the message image payload 406 may each be associated with multiple content collections using identifier values.

A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 110 on which the message 400 was generated and from which the message 400 was sent.

A message receiver identifier 424: an identifier (e.g., a messaging system identifier, email address, or device identifier) indicative of a user of the client device 110 to which the message 400 is addressed.

The contents (e.g., values) of the various components of the message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
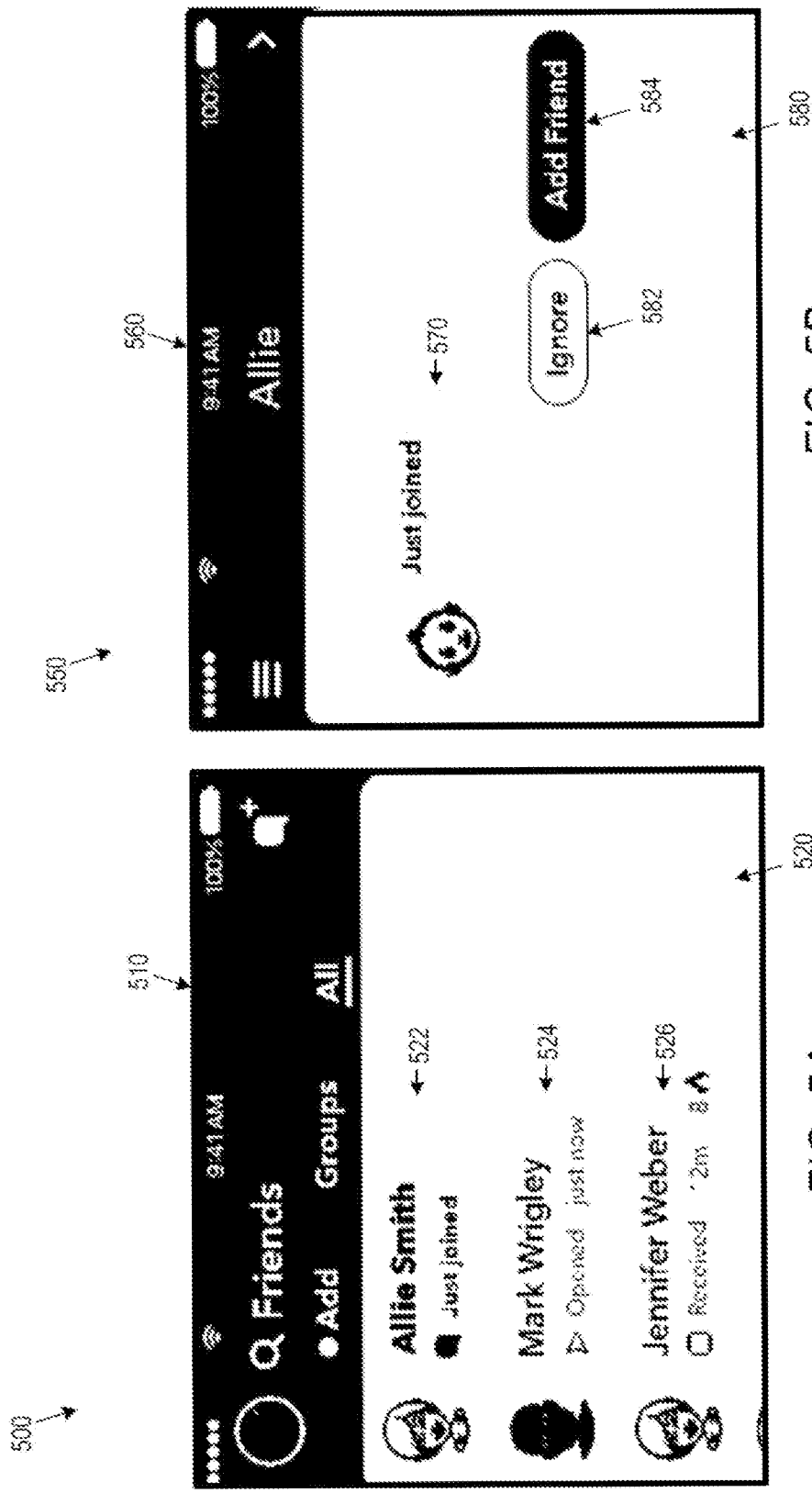
FIGS. 5A and 5B illustrate aspects of a user interface for connection information from a connection graph in association with some embodiments.

Users of a network may be presented with various interfaces to illustrate a user's connections and to assist a user with creating new connections. FIGS. 5A and 5B illustrates an example user interface for connections that a first user account has with multiple other user accounts, enabling simple communication actions with user accounts connected to the first user account. In order to simplify creation of such connections, a system may recommend connections to the first user based on existing connections between accounts connected to the first user and additional accounts.

FIG. 5A illustrates aspects of an example graphical user interfaces, according to some example embodiments. FIG. 5A shows user interface 500, which includes header 510 as well as content feed 520. Content feed 520 includes suggestion cell 522 and interactive content cells 524 and 526. User interface 500 is associated with a first user account and a display on the first user's device. Each of the cells 522, 524, and 526 are also associated with user accounts. Interactive content cells 524 and 526 are associated with accounts having a preexisting relationship with the first user account. The information in content cells 524 within interface 500 may identify how recently a message was sent, the type of content in the various messages linked to by the cell, an icon or graphic representative of the corresponding user account associated with the cell, or any other such information. Suggestion cell 522, by contrast, is associated with a user account not having a preexisting relationship with the first user account within the system. In the particular embodiment of FIG. 5A, the user account associated with cell 522 has just been created, and cell 522 includes information to that effect. Selecting cell 522 may lead to a linked interface, shown as user interface 550.

FIG. 5B illustrates aspects of an example graphical user interfaces, according to some example embodiments. The interface 550, which is associated with suggestion cell 522, includes header 560 identifying the account associated with cell 522. It also includes field 580 with information cell 570, hit target 582 which is an interface area for ignoring the suggested connection, and hit target 584, which is an interface area for accepting the suggested connection.

Figure 6:
FIG. 6 illustrates aspects of a user interface for connection suggestion information from a connection graph in association with some embodiments.

FIG. 6 illustrates an example user interface 600 allowing quick connections between users, or enabling a quick request of connections. User interface 600 includes a search area 602 which allows a user to search for specific user accounts within the system, as well as friend suggestions 604 and initiate connection interfaces 606. For example, the first user may have a connection with Jennifer Weber, but no connection with Gelly Acosta, whereas Jennifer Weber has a connection with both Gelly Acosta and the first user. Based on this, the account for Gelly Acosta may be placed on a friend suggestion list for the first user account. The above suggestion may be considered a "two-hop" suggestion, since within a graph, the account for Gelly Acosta is two connections away from the first user account. If the account for Gelly Acosta is connected with an account for Grace Howell, but the account for Grace Howell is not connected with either the first user account or the Jennifer Weber account, then the Grace Howell account is considered a "three-hop" suggestion, since the shortest path between the first user account and the Grace Howell account in the graph is three hops. A graph may contain users with large numbers of hops between them. In general, the fewer the number of hops from a first user to a suggested connection, the higher quality this suggestion is considered to be. In some embodiments, additional metrics may be used to sort among connections to identify higher and lower quality suggestions, essentially ranking connection suggestions. Such suggestions may be based on message content, frequency of system use, or other such options, depending on privacy settings and configurations for a system.

The user of a tool by the system to suggest connections based on the number of hops between users allows attackers to use this tool to gather social graph information. For privacy reasons, certain users may not wish to share information on their connections, and the suggestion tool has the potential to reveal some of the users connection information. In some embodiments, this may be directly addressed by allowing a user to opt-out of the suggested connection system. Some users, however, will either not consider or use such an option, or may wish to maintain some privacy while still allowing use of a suggestion tool with their account. Embodiments describe herein use a system with noisy hop suggestions to prevent simple determination of an accounts connection and to prevent large-scale leakage of graph information through a connection suggestion feature. This prevents direct inference of friend-lists of friends, and expands on the number of connection suggestions that may be displayed to certain users.

Embodiments described herein thus present connection suggestion in various ways. In one embodiment, a threshold percentage of suggestions uses the highest quality connection suggestions (e.g. two-hop connections), while the remaining suggestions use lower quality connection suggestions (e.g. 3 or more hop connections). In some such embodiments, when a user only has one friend, then only lower quality connections are suggested to prevent direct inference of the connections of that one friend. Further, the lower quality connections may be fixed for an account, to prevent the lower quality connections from being identified as they change while the higher quality connection recommendations remain stable. Further, in some embodiments, a minimum of one lower quality connection will be added with higher quality connections to ensure that some uncertainty is present in the connection recommendations, regardless of other thresholds. In some embodiments, an overall noise level (e.g. a percentage of lower quality suggestions) is maintained as a suggestion list is refreshed.

Further still, in some embodiments, a threshold check may be performed to verify that a user is not expected to be an attacker before any connection suggestions are provided. This may include additional limits, such as a time threshold after account creation before suggestions are provided, or other threshold limits. In some systems, it has been identified that malicious attacking accounts act together in actions that are somewhat synchronized. In some embodiments, a system may analyze account actions for synchronization with other accounts in a fashion that is associated with attacks on a system, regardless of whether an actual attack is identified. This may be combined with new account time limits or other limits on connection suggestion systems. During an analysis time period, a system is analyzed to identify synchronization between accounts that may be associated with collections of fake or compromised accounts used by attackers, and when such accounts are identified, connection suggestion systems may be altered to increase the number of lower quality suggestions, or to refuse to provide connection suggestions to the identified accounts. In some systems, this may automatically engage an out-out toggle for the connection recommendation system, and require additional verification or other procedures before an account holder is allowed to re-engage the connection recommendation system for the account. Similarly, other thresholds may be implemented for an account, such as increasing a minimum number of connections before a connection recommendation system may be used with the account.

Figure 7:
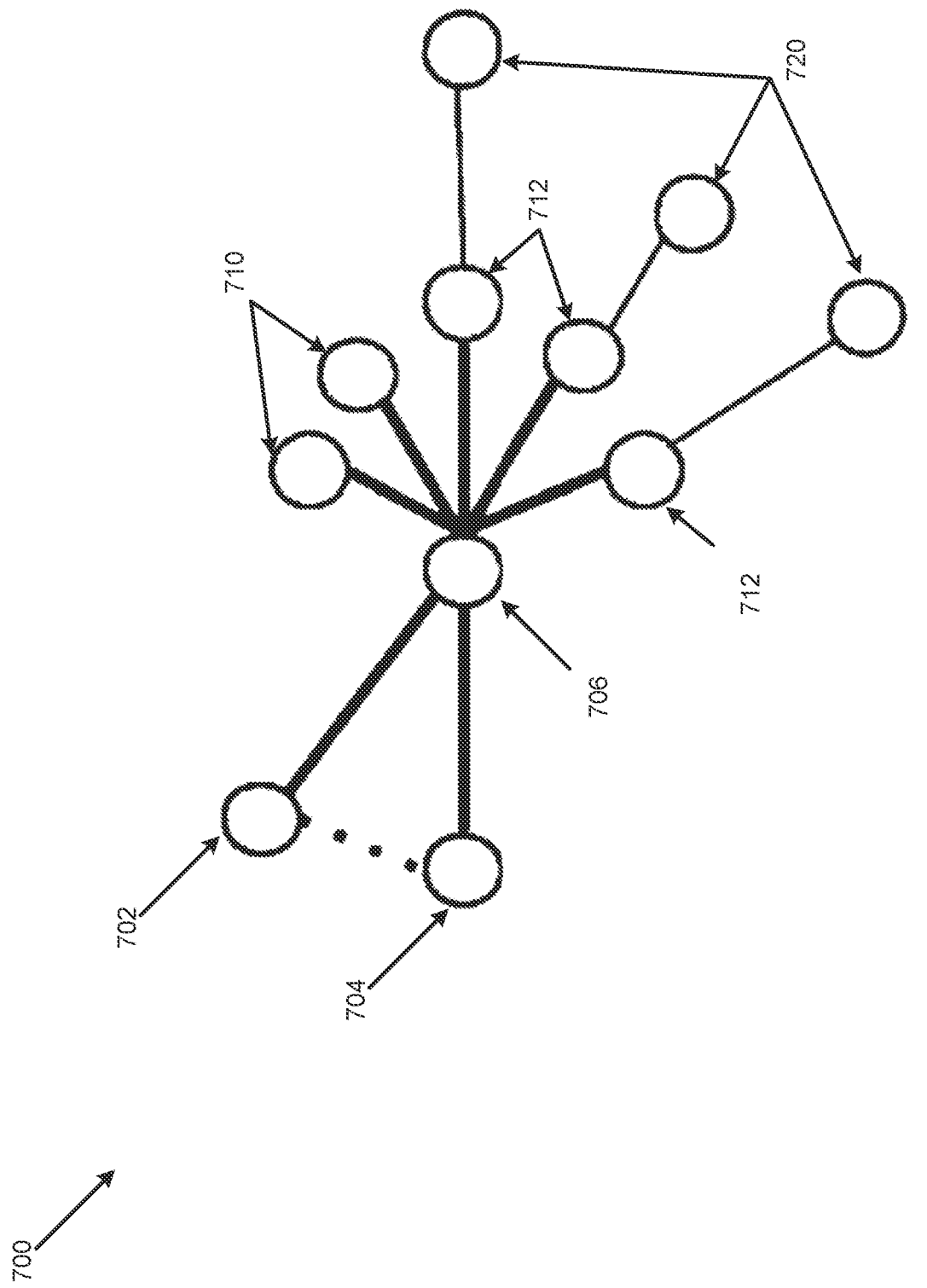
FIG. 7 illustrates aspects of connection suggestion information and an associated portion of a connection graph in accordance with some embodiments.
Figure 8:
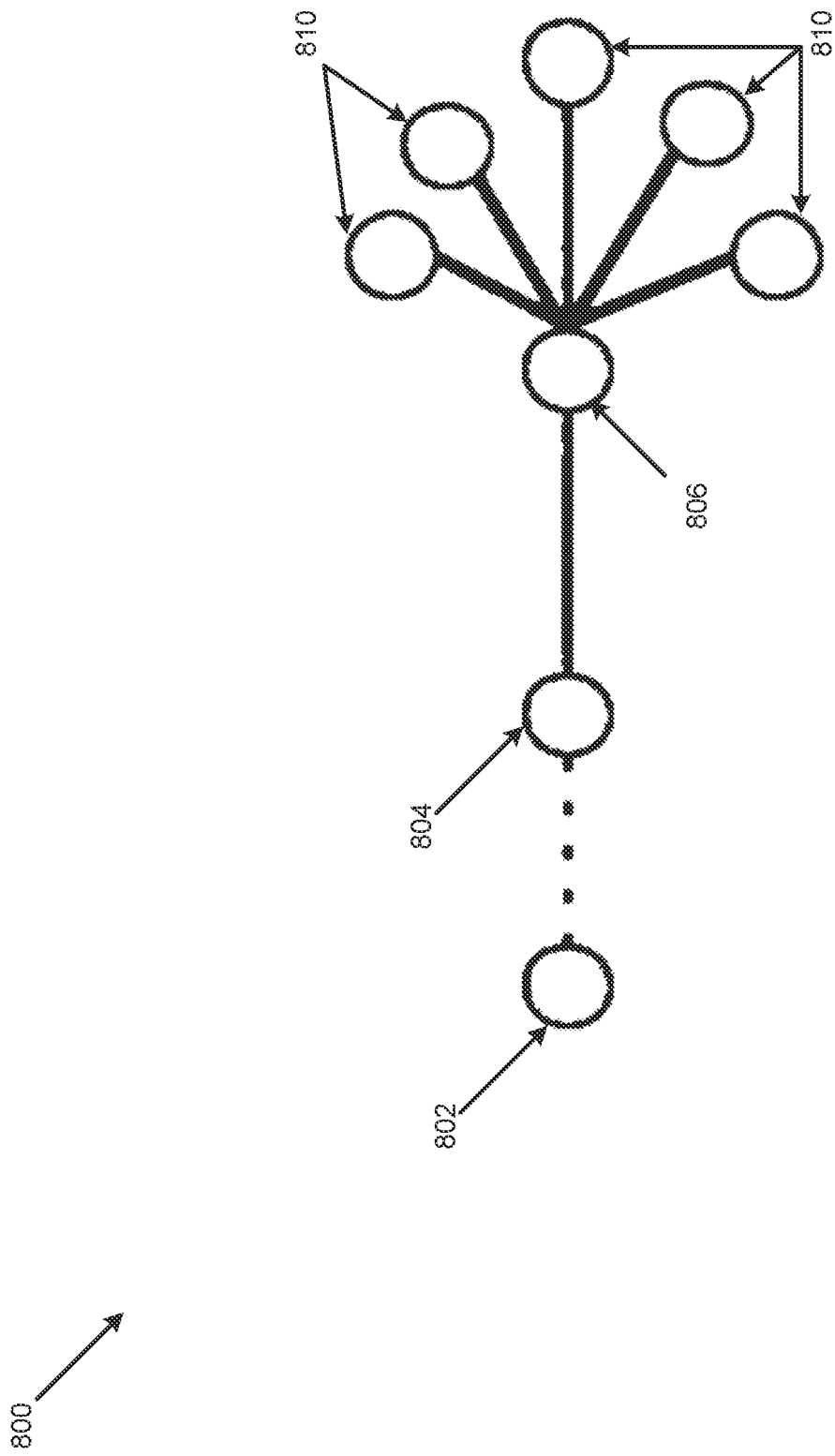
FIG. 8 illustrates aspects of connection suggestion information and an associated portion of a connection graph in accordance with some embodiments.

FIGS. 7 and 8 illustrate simple social graphs 700 and 800 with connections between entities (e.g. user accounts associated with nodes 702-720 and user accounts associated with nodes 802-810) that describe attack operations that may be addressed, at least in part, by various embodiments. As described above, given systems where connections are suggested to user accounts, various attacks may be used to derive graph information. FIG. 7 illustrates a simple graph with two attacker user accounts, shown as "Helper" node 702 and "Alice" node 704, both connected to an account for "Raj" node 706. An attacker with two accounts having different sets of friends with only "Raj" node 706 as the friend in common allows the two attacker accounts to infer the connections of the "Raj" node 706 account by taking the intersection of recommendations seen by the Alice node 704 and Helper node 702 accounts. In a simple system where only two-hop (e.g. from node 702 to nodes 710 or from note 702 to nodes 712) accounts are suggested, this allows for an accurate collection of the Raj node 706 account connections by Alice node 704 and Helper node 702 using the described differencing attack. Some systems may thus require accounts in these circumstances to be friends before providing both accounts with suggestions based on a shared connection. In some systems, connection suggestions may identify such circumstances, and modify suggested connections to prevent the intersection from being viewed, by adjusting the connection suggestions in various ways. For example, certain three-hop node (e.g. from node 702 to nodes 720 or from node 704 to nodes 720) suggestions can be used, to obscure the connections between Raj node 706 and the nodes 710 and 712 directly connected to Raj node 706. By suggesting a subset of the nodes 720 not directly connected to Raj node 706, information provided by a differencing attack by nodes 702 and 704 on Raj node 706 is obscured.

Similarly, FIG. 8 describes a friend of a friend attack, where Alice node 804 and the Helper node 802 accounts are attacking to discover connections to Bob node 806 (e.g. for nodes describing entity tables or relationships between accounts in a social networking system). In such a simple attack, the Helper node 802 account may be created in conjunction with the Alice node 804 account specifically for the purposed of identifying Bob node 806 connections. When the Helper node 802 account is created, the Alice node 804 account is added as the only connection. For systems with noisy added recommendations and no further limits, the automatic connection suggestions will contain connections to the Alice 804 node (e.g. only the Bob node 806), and a subset of accounts 810 connected to the Bob node 806 account selected as noisy/lower quality suggestions. This may enable the Helper node 802 account to identify a subset of connections to the Bob node 806 depending on the particular connections if Alice node 804 is connected to nodes other than the Bob node 806. Similar to the differencing attack described above for FIG. 7, a system may limit the number of connection suggestions in a variety of ways described herein to prevent information on the Bob node 806 accounts suggestions from being clear. This may include limits on connection suggestions based on the low number of the Helper account's connections, adjusting or randomizing connection suggestions based on the complexity of the two-hop and three-hop connections (or more hops depending on the system) for the Alice account, adjusting timing limits on connection suggestions, adjusting percentages of higher and lower quality suggestions, or other such changes to the connection suggestions offered to both the Alice and Helper accounts.

Figure 9:
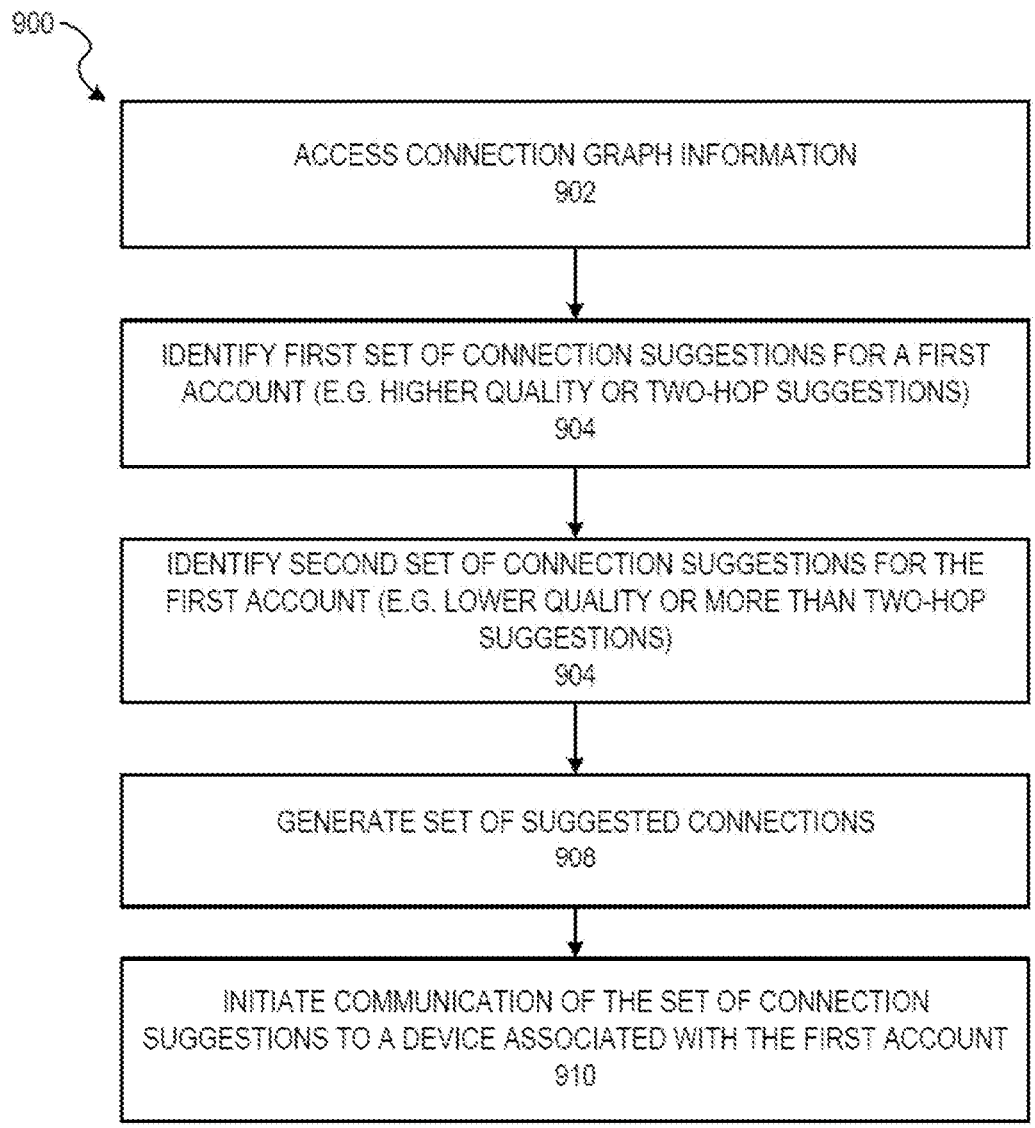
FIG. 9 illustrates an example method in accordance with some embodiments.

FIG. 9 illustrates an example method 900 performed by a device as part of a social network system described herein. In some embodiments, the method 900 of FIG. 9 may be implemented by one or more processors of a device or an apparatus of any machine described herein. In other embodiments, the method 300 may be implemented as computer-readable instructions in a storage medium that, when executed by one or more processors of a device, cause the device to perform the method 900.

Method 900 involves operation 902 of accessing connection graph information for a plurality of user accounts in a system. In operation 904, the system continues by identifying a first set of connection suggestions based on a first set of suggestion metrics (e.g. two-hop connections, usage characteristics, profile match, etc.) The second set of connection suggestions based on a second set of suggestion metrics (e.g. metrics different than the first set of metrics) are identified in operation 906. In various embodiments, the second set of connection suggestions and the second set of suggestion metrics are configured to obscure the first set of connection suggestions (e.g. by providing different metrics and making it difficult to infer information or metrics from the provided final set of connection suggestions). The in operation 908 the system continues by generating the set of suggested connections based on the first set of connection suggestions and the second set of connection suggestions, and further continues in operation 910 by initiating communication of the set of connection suggestions to a device associated with the first account.

In some embodiments, the first set of suggestion metrics comprises a 2-hop connection metric. In some embodiments, the second set of suggestion metrics comprises a three or more hop connection requirement. In some embodiments, the first set of suggestion metrics comprises a set of high quality connection metrics and the second set of suggestion metrics comprises a set of low quality connection requirements. Some such systems may operate where the set of suggested connections contains a minimum number of connection suggestions from the second set of connection suggestions or where the set of suggested connections contains a threshold percentage of connection suggestions from the second set of connection suggestions.

In some embodiments, a threshold number of high quality suggestions (e.g. a low number of connection hops between nodes) is used for an initial set of suggestions, and a corresponding amount of low quality suggestions (e.g. higher numbers of connection hops) are used. Over time, the number of high-quality suggestions is increased, and the number of low quality suggestions is decreased. In some embodiments, the percentage of high and low quality recommendations in an initial recommendation set is randomized within set parameters (e.g. between 30 and 60 percent high quality recommendations). In some embodiments, the percentage of high quality recommendations also changes randomly to prevent tracking and associated differencing attacks based on knowledge of the set parameters and changes made by a connection suggestion system. Some systems bay inserts a random number of low quality recommendations within a threshold amount (e.g. less than 30% having three or more hops), or a fixed number of recommendations having set characteristics (e.g. at least one suggestion having three hops and at least one suggestion having four hops).

In some embodiments, a scoring analysis is done on possible account connections to determine that a relationship meets criteria for a high quality recommendation. In some embodiments, such a high quality suggestion determinations is presented based on a new content quick add suggestion or a connection add score generated by analyzing all information in a system, including affinity information, user provided non-private characteristic information, or other such information designated as not being private by a user. In some such embodiments, a system may determine options for potential connections with other users, and the user associated with the high quality suggestions may be selected from the top percentage (e.g. 25%, 10%, etc.) of potential user accounts, or may be based on the potential user account match being above a threshold.

In some embodiments, as described above, the creation of a high quality suggestion may be based on a computed analysis, or score, associated with an expected connection between two user accounts. Additionally, such high quality suggestions can be based the number of connections between a user account and other accounts in the system, such that the greater the number of connections, the more likely the suggestion to connect with that account as a high quality suggestion. Limiting connections for new accounts to high quality suggestions which have large numbers of existing connections also limits differentiation attacks. For example, if a new user is provided a maximum of eight connection suggestions, the connection suggestions can be limited to being based only on connections with existing users having more than a threshold (e.g. more than eight, more than sixteen, or a certain multiple of the maximum number of suggestions). By preventing the use of an account with fewer connections than the number of possible friend suggestions, a differencing attack on that account is prevented. For example, if a new account is connected to a single friend account, and the friend account only has three existing connections, the friend account or information from the friend account (e.g. the three existing connections) can be blocked from use in providing account suggestions to the new account. Such a limit can be time based, and during the restricted time, either no connection information is used, or in some embodiments, a minimum number of connection hops (e.g. three or more) can be set to prevent a differencing attack.

In some embodiments, a scoring for generating high quality friend suggestions are generated by feedback or machine learning to set a quality score. Such systems may use neural networks to extract features identified as preferred or interesting to system users. For example, in some embodiments, user accounts may have preferences selected in a system, and comparisons with other user accounts to match those preferences may be performed. In some systems, a user may elect privacy settings which authorize the system to analyze data from a wide variety of sources and match that information to expected connections with other users of the system. Such data may have features extracted and analyzed using a feed-forward artificial neural network such as a convolutional neural network to identify expected desirable connections with other user accounts in the system. Feature maps used within such neural networks may be based on any analysis metric described herein, including both high quality suggestions for friend associations. In some embodiments, learnable filters may be selected and automatically updated based on a database of interaction history for suggestions, again based on a user's privacy settings. In other embodiments, any other such sources may be used for learnable filters to generate high and low quality friend suggestions.

Additionally, as described above, before generating or analyzing possible connection suggestions, a system may perform an analysis of synchronized attack behavior prior to generating the set of suggested connections, and to prevent generation of suggested connections for accounts of the plurality of accounts that are associated with synchronized attack behavior. Such analysis can involve identifying certain connection patterns, such as an account connected to only one other account, a chain of accounts connected to less than a threshold number of other accounts, a chain of accounts created within a threshold time period that are connected to only each other plus less than a threshold number of accounts (e.g. less than two accounts other than the new accounts, or less than three accounts other than the new accounts). Other embodiments may further limit connection suggestions with systems to verify a time threshold from account creation has been met before initiating communication of the set of connection suggestions to the device associated with the first account.

As described above, one metric limits connection suggestions based on the low number of one account's current connections (e.g. only one connection, less than three connections, less than five connections, etc.). Some embodiments adjust or randomize connection suggestions based on the complexity of the two-hop and three-hop connections (or more hops depending on the system) for a new account, adjust timing limits on connection suggestions (e.g. suggestions are only made every 24 hours, once a week, etc.), adjusting percentages of higher and lower quality suggestions (e.g. with higher quality suggestions based on fewer hops and other entity table information about shared characteristics between system accounts), or other such changes to the connection suggestions offered to new accounts or accounts with low numbers of suggestions (e.g. suggesting popular or celebrity account connections to new or low connection accounts, or suggesting connections based on location, affinity group information, or other such information other than existing account relationships).

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

In addition to the above example embodiments, any combination of operations or elements described above may be integrated into various embodiments described herein. Additionally, other example embodiments may include any examples described above with the individual operations or device elements repeated or ordered with intervening elements or operations in any functional order.

Figure 10:
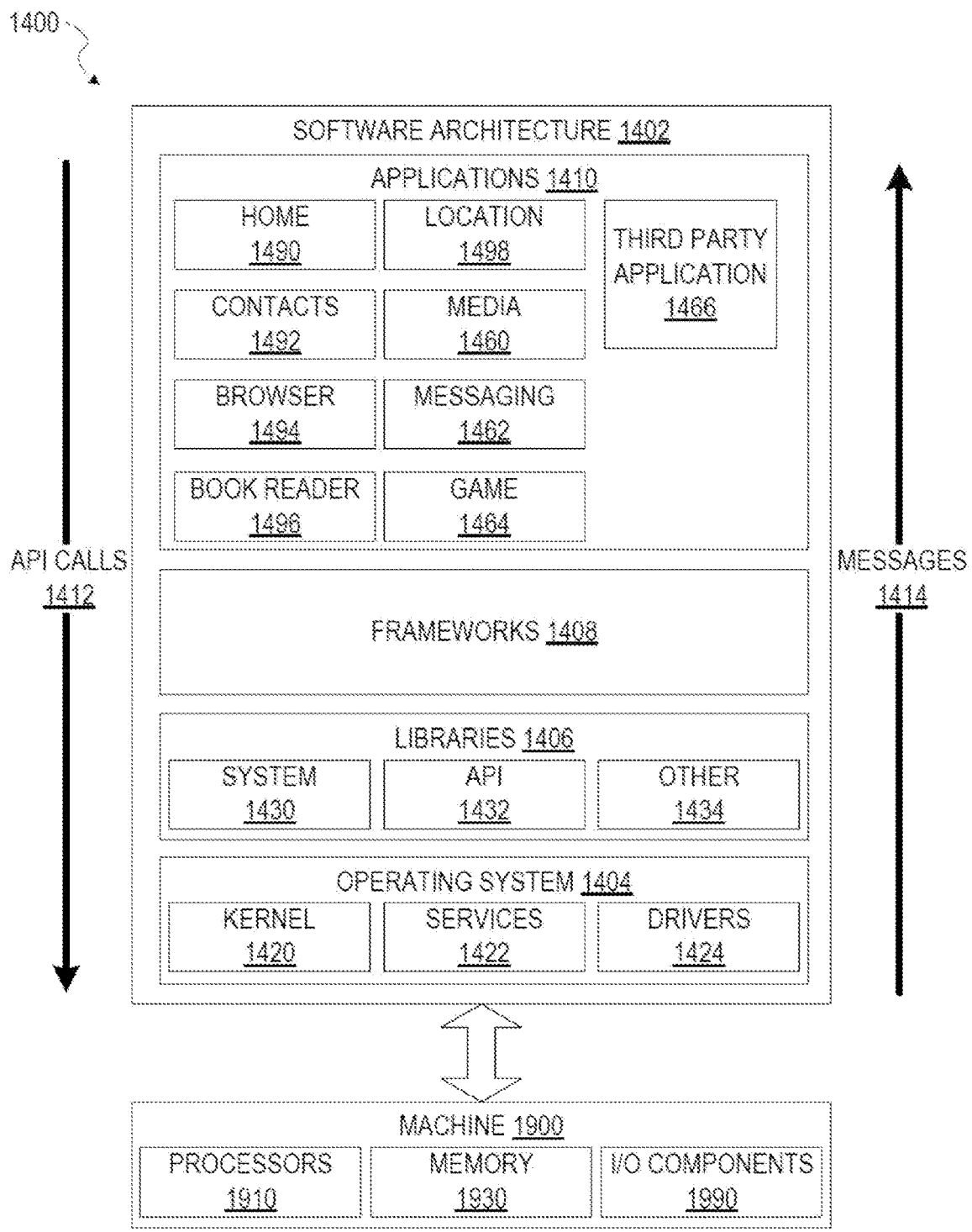
FIG. 10 is a block diagram illustrating an example of a software architecture that may be installed on a machine, according to some example embodiments.

FIG. 10 is a block diagram 1400 illustrating a software architecture 1402, which can be installed on any one or more of the devices described above. For example, in various embodiments, client devices 110, server systems 102, 112, 116, 118, 122, and 124 may be implemented using some or all of the elements of the software architecture 1402. FIG. 10 is merely a non-limiting example of a software architecture, and it will be appreciated that many other architectures can be implemented to facilitate the functionality described herein. In various embodiments, the software architecture 1402 is implemented by hardware such as machine 1500 of FIG. 11 that includes processors 1510, memory 1530, and I/O components 1550. In this example, the software architecture 1402 can be conceptualized as a stack of layers where each layer may provide a particular functionality. For example, the software architecture 1402 includes layers such as an operating system 1404, libraries 1406, frameworks 1408, and applications 1410. Operationally, the applications 1410 invoke API calls 1412 through the software stack and receive messages 1414 in response to the API calls 1412, consistent with some embodiments.

In various implementations, the operating system 1404 manages hardware resources and provides common services. The operating system 1404 includes, for example, a kernel 1420, services 1422, and drivers 1424. The kernel 1420 acts as an abstraction layer between the hardware and the other software layers, consistent with some embodiments. For example, the kernel 1420 provides memory management, processor management (e.g., scheduling), component management, networking, and security settings, among other functionality. The services 1422 can provide other common services for the other software layers. The drivers 1424 are responsible for controlling or interfacing with the underlying hardware, according to some embodiments. For instance, the drivers 1424 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 1406 provide a low-level common infrastructure utilized by the applications 1410. The libraries 1406 can include system libraries 1430 (e.g., C standard library) that can provide functions such as memory allocation functions, string manipulation functions, mathematic functions, and the like. In addition, the libraries 1406 can include API libraries 1432 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 1406 can also include a wide variety of other libraries 1434 to provide many other APIs to the applications 1410.

The frameworks 1408 provide a high-level common infrastructure that can be utilized by the applications 1410, according to some embodiments. For example, the frameworks 1408 provide various graphic user interface (GUI) functions, high-level resource management, high-level location services, and so forth. The frameworks 1408 can provide a broad spectrum of other APIs that can be utilized by the applications 1410, some of which may be specific to a particular operating system 1404 or platform.

In an example embodiment, the applications 1410 include a home application 1450, a contacts application 1452, a browser application 1454, a book reader application 1456, a location application 1458, a media application 1460, a messaging application 1462, a game application 1464, and a broad assortment of other applications such as a third party application 1466. According to some embodiments, the applications 1410 are programs that execute functions defined in the programs. Various programming languages can be employed to create one or more of the applications 1410, structured in a variety of manners, such as object-oriented programming languages (e.g., Objective-C, Java, or C++) or procedural programming languages (e.g., C or assembly language). In a specific example, the third party application 1466 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third party application 1466 can invoke the API calls 1412 provided by the operating system 1404 to facilitate functionality described herein.

Figure 11:
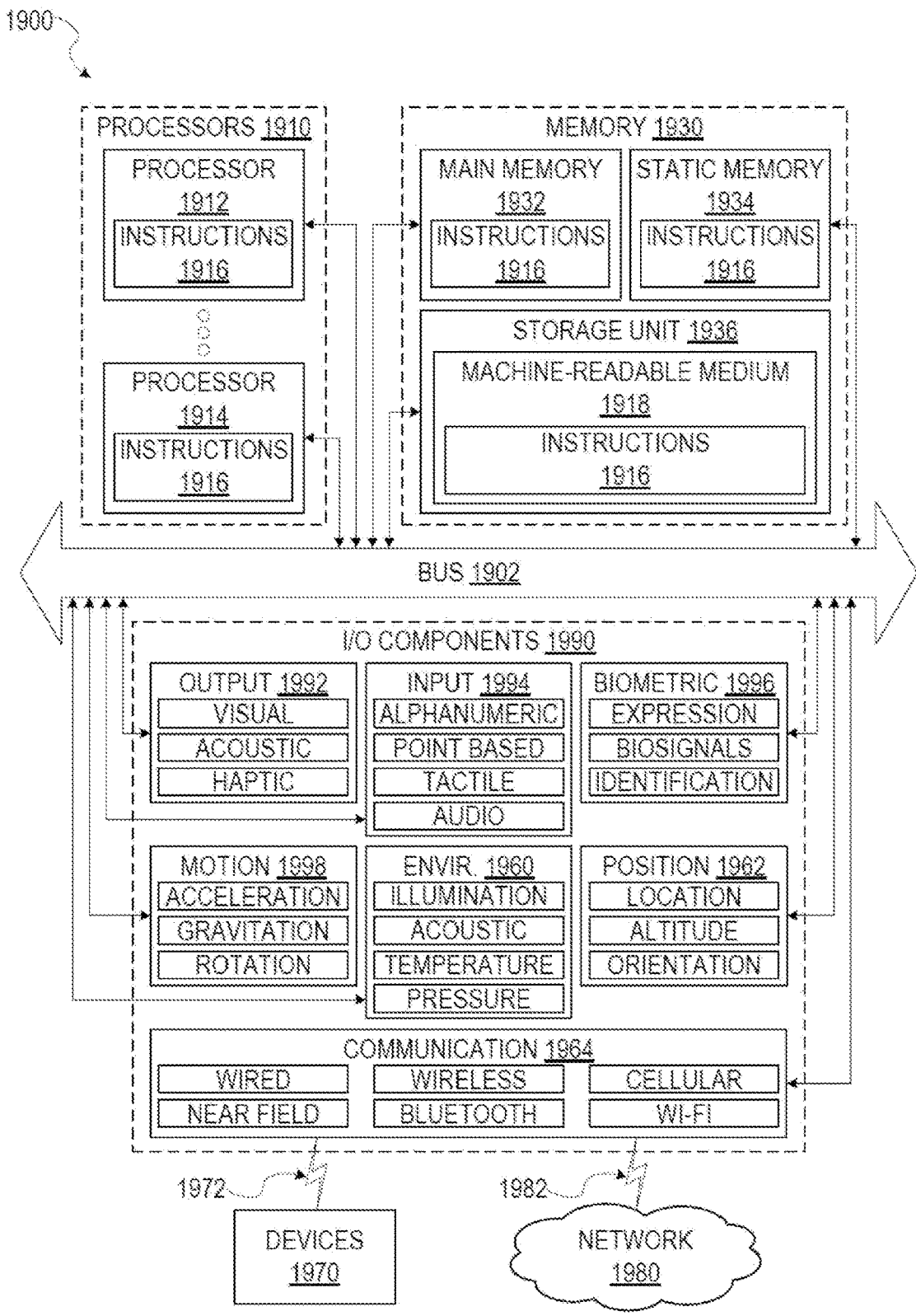
FIG. 11 illustrates a diagrammatic representation of a machine, in the form of a computer system, within which a set of instructions may be executed for causing the machine to perform any one or more of the methodologies discussed herein, according to an example embodiment.

FIG. 11 is a block diagram illustrating components of a machine 1500, according to some embodiments, able to read instructions from a machine-readable medium (e.g., a machine-readable storage medium) and perform any one or more of the methodologies discussed herein. Specifically, FIG. 11 shows a diagrammatic representation of the machine 1500 in the example form of a computer system, within which instructions 1516 (e.g., software, a program, an application, an applet, an app, or other executable code) for causing the machine 1500 to perform any one or more of the methodologies discussed herein can be executed. In alternative embodiments, the machine 1500 operates as a stand-alone device or can be coupled (e.g., networked) to other machines. In a networked deployment, the machine 1500 may operate in the capacity of a server machine 102, 112, 116, 118, 122, 124, and the like, or a client device 110 in a server-client network environment, or as a peer machine in a peer-to-peer (or distributed) network environment. The machine 1500 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1516, sequentially or otherwise, that specify actions to be taken by the machine 1500. Further, while only a single machine 1500 is illustrated, the term "machine" shall also be taken to include a collection of machines 1500 that individually or jointly execute the instructions 1516 to perform any one or more of the methodologies discussed herein.

In various embodiments, the machine 1500 comprises processors 1510, memory 1530, and I/O components 1550, which can be configured to communicate with each other via a bus 1502. In an example embodiment, the processors 1510 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 1512 and a processor 1514 that may execute the instructions 1516. The term "processor" is intended to include multi-core processors 1510 that may comprise two or more independent processors 1512, 1514 (also referred to as "cores") that can execute instructions 1516 contemporaneously. Although FIG. 11 shows multiple processors 1510, the machine 1500 may include a single processor 1510 with a single core, a single processor 1510 with multiple cores (e.g., a multi-core processor 1510), multiple processors 1512, 1514 with a single core, multiple processors 1512, 1514 with multiple cores, or any combination thereof.

The memory 1530 comprises a main memory 1532, a static memory 1534, and a storage unit 1536 accessible to the processors 1510 via the bus 1502, according to some embodiments. The storage unit 1536 can include a machine-readable medium 1518 on which are stored the instructions 1516 embodying any one or more of the methodologies or functions described herein. The instructions 1516 can also reside, completely or at least partially, within the main memory 1532, within the static memory 1534, within at least one of the processors 1510 (e.g., within the processor's cache memory), or any suitable combination thereof, during execution thereof by the machine 1500. Accordingly, in various embodiments, the main memory 1532, the static memory 1534, and the processors 1510 are considered machine-readable media 1518.

As used herein, the term "memory" refers to a machine-readable medium 1518 able to store data temporarily or permanently and may be taken to include, but not be limited to, random-access memory (RAM), read-only memory (ROM), buffer memory, flash memory, and cache memory. While the machine-readable medium 1518 is shown, in an example embodiment, to be a single medium, the term "machine-readable medium" should be taken to include a single medium or multiple media (e.g., a centralized or distributed database, or associated caches and servers) able to store the instructions 1516. The term "machine-readable medium" shall also be taken to include any medium, or combination of multiple media, that is capable of storing instructions (e.g., instructions 1516) for execution by a machine (e.g., machine 1500), such that the instructions 1516, when executed by one or more processors of the machine 1500 (e.g., processors 1510), cause the machine 1500 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1550 include a wide variety of components to receive input, provide output, produce output, transmit information, exchange information, capture measurements, and so on. In general, it will be appreciated that the I/O components 1550 can include many other components that are not shown in FIG. 11. The I/O components 1550 are grouped according to functionality merely for simplifying the following discussion, and the grouping is in no way limiting. In various example embodiments, the I/O components 1550 include output components 1552 and input components 1554. The output components 1552 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1554 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1550 include biometric components 1556, motion components 1558, environmental components 1560, or position components 1562, among a wide array of other components. For example, the biometric components 1556 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1558 include acceleration sensor components (e.g., accelerometer), gravitation sensor components, rotation sensor components (e.g., gyroscope), and so forth. The environmental components 1560 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1562 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1550 may include communication components 1564 operable to couple the machine 1500 to a network 1580 or devices 1570 via a coupling 1582 and a coupling 1572, respectively. For example, the communication components 1564 include a network interface component or another suitable device to interface with the network 1580. In further examples, communication components 1564 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1570 may be another machine 1500 or any of a wide variety of peripheral devices (e.g., a peripheral device coupled via a Universal Serial Bus (USB)).

Moreover, in some embodiments, the communication components 1564 detect identifiers or include components operable to detect identifiers. For example, the communication components 1564 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1564, such as location via Internet Protocol (IP) geolocation, location via WI-FI® signal triangulation, location via detecting a BLUETOOTH® or NFC beacon signal that may indicate a particular location, and so forth.

In various example embodiments, one or more portions of the network 1580 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1580 or a portion of the network 1580 may include a wireless or cellular network, and the coupling 1582 may be a Code Division Multiple Access (CDMA) connection, a Global System for Mobile communications (GSM) connection, or another type of cellular or wireless coupling. In this example, the coupling 1582 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1516 are transmitted or received over the network 1580 using a transmission medium via a network interface device (e.g., a network interface component included in the communication components 1564) and utilizing any one of a number of well-known transfer protocols (e.g., Hypertext Transfer Protocol (HTTP)). Similarly, in other example embodiments, the instructions 1516 are transmitted or received using a transmission medium via the coupling 1572 (e.g., a peer-to-peer coupling) to the devices 1570. The term "transmission medium" shall be taken to include any intangible medium that is capable of storing, encoding, or carrying the instructions 1516 for execution by the machine 1500, and includes digital or analog communications signals or other intangible media to facilitate communication of such software.

Furthermore, the machine-readable medium 1518 is non-transitory (in other words, not having any transitory signals) in that it does not embody a propagating signal. However, labeling the machine-readable medium 1518 "non-transitory" should not be construed to mean that the medium is incapable of movement; the medium 1518 should be considered as being transportable from one physical location to another. Additionally, since the machine-readable medium 1518 is tangible, the machine-readable medium 1518 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A device comprising:
    a memory configured to store connection graph information for a plurality of user accounts; and
    processing circuitry configured generate a set of suggested connections for a first account of the plurality of user accounts using the connection graph information by:
    identifying, by the processing circuitry, a first set of connection suggestions based on a first set of suggestion metrics;
    identifying, by the processing circuitry, a second set of connection suggestions based on a second set of suggestion metrics, wherein the second set of connection suggestions and the second set of suggestion metrics are configured to obscure the first set of connection suggestions;
    generating, by the processing circuitry, the set of suggested connections based on the first set of connection suggestions and the second set of connection suggestions;
    initiating, by the processing circuitry, communication of the set of suggested connections to a client device associated with the first account; and
    modifying, by the processing circuitry and over a period of time, a percentage of the set of suggested connections corresponding to the first set of connection suggestions and a percentage of the set of suggested connections corresponding to the second set of connection suggestions.

2. The device of claim 1, wherein the processing circuitry is further configured to determine a subset of the plurality of user accounts having less than a threshold number of connections with other accounts of the plurality of user accounts.

3. The device of claim 1, wherein the first set of suggestion metrics comprises a 2-hop connection metric.

4. The device of claim 3, wherein the second set of suggestion metrics comprises a three or more hop connection requirement.

5. The device of claim 1, wherein the percentage of the set of suggested connections corresponding to the first set of suggestion metrics is increased and the percentage of the set of suggested connections corresponding to the second set of suggestion metrics is decreased.

6. The device of claim 1, wherein the set of suggested connections contains a minimum number of connection suggestions from the second set of connection suggestions.

7. The device of claim 1, wherein the set of suggested connections contains a threshold percentage of connection suggestions from the second set of connection suggestions.

8. The device of claim 1, wherein the processing circuitry is further configured to perform an analysis of synchronized attack behavior prior to generating the set of suggested connections, and to prevent generation of suggested connections for accounts of the plurality of user accounts that are associated with synchronized attack behavior.

9. The device of claim 1, wherein the processing circuitry is further configured to verify a time threshold from account creation has been met before initiating communication of the set of suggested connections to the device associated with the first account.

10. A method comprising:
    storing, in a memory of an apparatus, connection graph information for a plurality of user accounts;
    identifying, by one or more processors of the apparatus, a first set of connection suggestions based on a first set of suggestion metrics;
    identifying, by the one or more processors of the apparatus, a second set of connection suggestions based on a second set of suggestion metrics, wherein the second set of connection suggestions and the second set of suggestion metrics are configured to obscure the first set of connection suggestions;
    generating, by the one or more processors of the apparatus, a set of suggested connections based on the first set of connection suggestions and the second set of connection suggestions;
    initiating, by the one or more processors of the apparatus, communication of the set of suggested connections to a client device associated with a first user account; and
    modifying, by the one or more processors of the apparatus and over a period of time, a percentage of the set of suggested connections corresponding to the first set of connection suggestions and a percentage of the set of suggested connections corresponding to the second set of connection suggestions.

11. The method of claim 10, wherein the set of suggested connections is generated using one or more features maps generated by one or more convolutional neural networks.

12. The method of claim 11, wherein data analyzed by the one or more convolutional neural networks is based on privacy settings of the plurality of user accounts.

13. The method of claim 10, wherein the set of suggested connections contains a minimum number of connection suggestions from the second set of connection suggestions.

14. The method of claim 10, wherein the set of suggested connections contains a threshold percentage of connection suggestions from the second set of connection suggestions.

15. The method of claim 10, wherein the one or more processors of the apparatus are configured to perform an analysis of synchronized attack behavior prior to generating the set of suggested connections, and to prevent generation of suggested connections for accounts of the plurality of user accounts that are associated with synchronized attack behavior.

16. The method of claim 10, wherein the one or more processors of the apparatus are configured to verify a time threshold from account creation has been met before initiating communication of the set of suggested connections to the client device associated with the first user account.

17. One or more non-transitory computer readable media comprising instructions that, when executed one or more processors of a computing system, cause the computing system to perform operations comprising:
   storing connection graph information for a plurality of user accounts;
   identifying a first set of connection suggestions based on a first set of suggestion metrics;
   identifying a second set of connection suggestions based on a second set of suggestion metrics, wherein the second set of connection suggestions and the second set of suggestion metrics are configured to obscure the first set of connection suggestions;
   generating a set of suggested connections based on the first set of connection suggestions and the second set of connection suggestions;
   initiating communication of the set of suggested connections to a client device associated with a first user account; and
   modifying, over a period of time, a percentage of the set of suggested connections corresponding to the first set of connection suggestions and a percentage of the set of suggested connections corresponding to the second set of connection suggestions.

18. The one or more non-transitory computer readable media of claim 17, wherein processing circuitry of the computing system is configured to verify a time threshold from account creation has been met before initiating communication of the set of suggested connections to the client device associated with the first user account.

19. The one or more non-transitory computer readable media of claim 17, wherein the percentage of the set of suggested connections corresponding to the first set of connection suggestions is increased and the percentage of the set of suggested connections corresponding to the second set of connection suggestions is decreased.

* * * * *